United States Patent Office
2,806,268
Patented Sept. 17, 1957

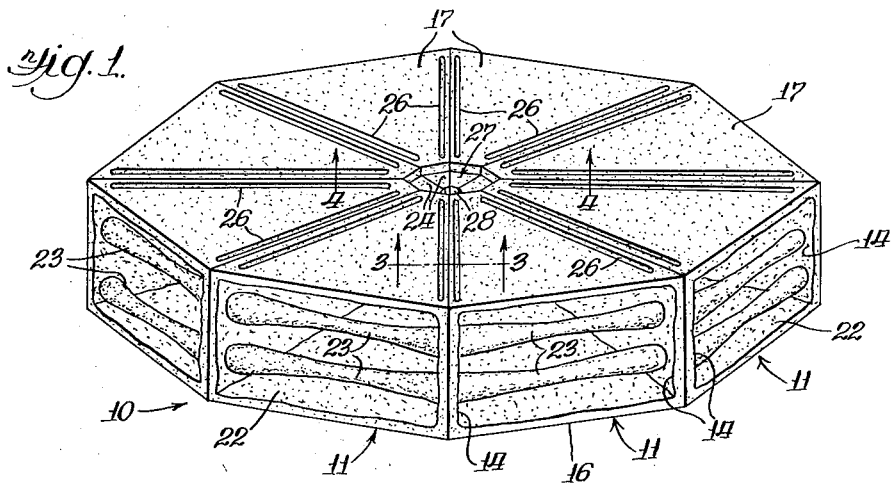
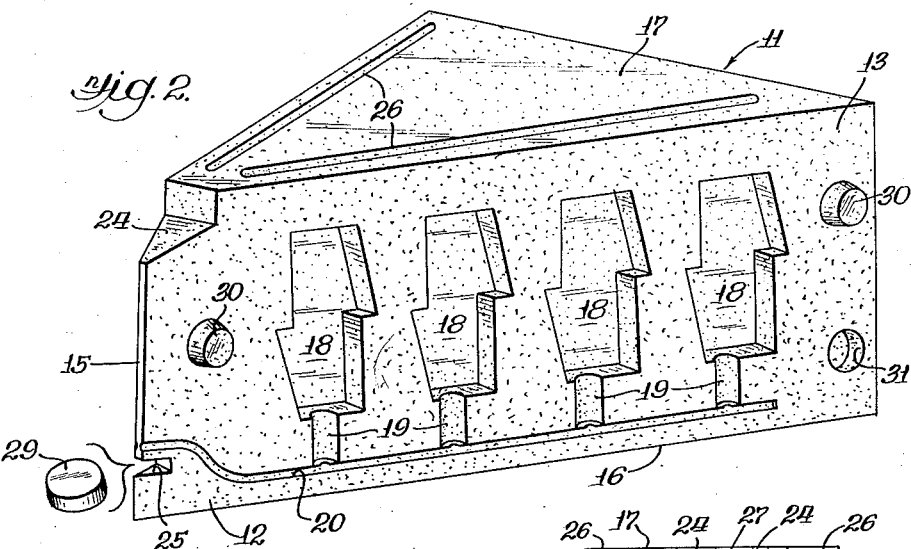
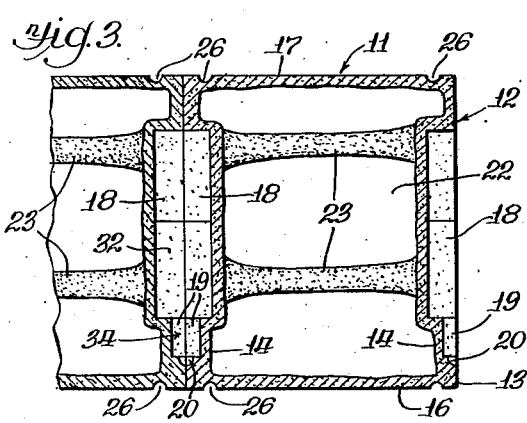
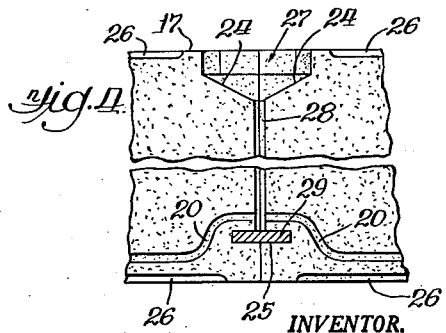

2,806,268

SHELL MOLD

Halsey R. Bilter, Evanston, Ill., assignor to International Harvester Company, a corporation of New Jersey Application May 26, 1954, Serial No. 432,535

3 Claims. (Cl. 22—130)

This invention relates to an improved mold. More specifically this invention relates to a frangible shell-type mold.

In the relatively new foundry technique of shell molding, a shell mold generally comprises a pair of frangible relatively thin half portions which are placed together in complementary relation to form a receiving cavity for cast metal. The frangible members are generally made of a sand and resin mixture which is suitably baked in an oven to make suitable shells. During the casting operation the shell molds are held in assembly, as a unitary mold, by means of clamping members, adhesives, or other devices. In addition it is usually necessary to place the molds in a mold box containing a heavy substance such as shot or sand, or other dense substance which supports the side walls of the mold during the pouring operation. This support is generally necessary to provide suitable reinforcement against the surfaces of the molds to prevent their destruction while the metal pouring operation is going on. The support of the shell molds in this manner is expensive from the standpoint of time and material. Furthermore, the complementary half portions usually must be held together by an adhesive bond or other suitable means. It is of great advantage, therefore, to provide a shell-type of mold that need not depend upon separate components for supporting the mold during the pouring operation or one that requires bonding of the shell halves. It is a prime object of this invention, therefore, to provide an improved shell mold which dispenses with the backing up materials normally employed in a shell mold foundry process and one which does not require adhesives for bonding together the shell halves.

It is another object to provide an improved mold wherein better dimensional control of casting is possible due to stronger and more rigid shells which do not require the assistance of a backing up material during the casting operation.

A still further object is to provide an improved shell mold wherein a plurality of parts can be cast, the shell mold including a common pouring basin connected with a suitable runner passage for simultaneously delivering cast material to a plurality of receiving cavities in the mold.

A still further object is to provide an improved shell mold wherein the mold consists of a plurality of triangularly shaped segments positioned in circumferentially disposed relation, the mold segments including recesses which form a material receiving cavity, the mold segments being arranged in such a manner that each segment in combination with an adjacent segment provides rigid support for the mold walls without the addition of extraneous elements for supporting the mold during the pouring operation.

Another object is to provide a shell-type frangible mold comprising a plurality of separable portions which are shaped to complement each other to form a plurality of mold cavities, these segments being so arranged to support each other in a manner wherein no extraneous supporting elements are necessary during the casting operation.

These and other objects will become more readily apparent from a reading of the specification when examined in connection with the accompanying sheet of drawing.

In the drawing:

Figure 1 is a perspective view looking down upon a completely assembled shell-type mold ready for a casting operation;

Figure 2 is an enlarged perspective view of a segment of an improved shell mold;

Figure 3 is an enlarged cross sectional view through a shell mold taken substantially along the line 3—3 of Figure 1; and Figure 4 is an enlarged view taken substantially along the line 4—4 of Figure 1.

A shell mold is generally designated by the reference character 10. The shell mold comprises a plurality of individual segments of triangular shape designated at 11. Each segment 11 comprises vertically extending or upright side walls 12 having outer surfaces 13 and inner surfaces 14. The side walls 12 are connected together at first ends or at an apex as generally indicated at 15. Each segment comprises a triangular lower wall 16 and a triangular upper wall 17, all of the walls being integrally connected and formed in a conventional shell mold forming operation.

The outer surfaces 13 of the side walls include a plurality of laterally spaced recesses 18 which are in communication with vertical grooves 19 formed in the outer surface 13. The vertical grooves 19 are connected to grooves 20 also disposed in the outer surface 13, the said grooves 20 extending to the apex 15 or connected ends of the side walls 12 as indicated.

The side walls 12 are disposed in diverging relation and with the lower walls 16 and upper walls 17 form a relatively hollow chamber 22 which has contained therein a plurality of laterally extending supports 23 integrally formed and connected to the side walls 12.

Each segment 11 is provided with a cut-out portion 24 disposed adjacent the upper wall 17 and at the apex 15 of the side walls 12. An indentation 25 is also formed in each segment adjacent to the lower wall 16. The lower and upper walls 16 and 17 respectively are also provided with diverging grooves 26 which are designed to hold the shell segment steady while the pattern faces (not shown) are withdrawn from the shell after it has been suitably formed.

As best shown in Figures 1, 3, and 4, the shell mold 10 in the assembled position ready for pouring is what may be termed as "pie-shaped." The making of the segments from the pattern involved will not be described since the invention is believed to reside in the mold segments and complete mold itself. After the mold segments have been made in the manner indicated, it is desired to place them in the position shown in Figure 1. In order to place them in position the wedge or triangular shaped box-like segments 11 are placed in two sub-assemblies. It is, of course, apparent that the wedge angle or triangular angle of the individual shells would have to be evenly divisible into 360 degrees. The angles most commonly used would be 30, 45, and 60 degrees. Each mold would be assembled by placing half the required number of shells in a semi-circle and thereupon placing another equal number of shells in another semi-circle. When both groups of shells are thus placed they are pushed together into one complete whole as indicated in Figure 1.

By placing the individual segments 11 as indicated in circumferentially disposed though contiguous relation, the apices 15 of the segments 11 can be considered as oppositely disposed with respect to each other. In view of the cut-out portions 24, which also are disposed in this manner, a central pouring basin 27 is provided. The central pouring basin is in communication with a vertical sprue 28 which is formed by keeping the apices 15 suitably spaced from each other when the segments are placed into the assembled position. As best indicated in Figures 2 and 4 each segment is also provided with an indentation 25 disposed immediately below the groove 20. As indicated particularly in Figure 2 the groove 20 terminates immediately adjacent the said indentation 25. In the assembly shown in Figures 1 and 3 a frangible disk 29 is inserted in and held in the indentations 25 to form a bottom for the sprue so that cast material will be prevented from leaking out of the bottom of said sprue.

Each of the outer surfaces 13 of the segments 11 are also provided with projecting buttons 30 and bores 31 these being suitably provided on the surfaces so that complementary buttons and bores 30 and 31 respectively will be placed into registering or telescoping relation during the positioning of the segments as indicated in Figure 1. When the segments are positioned as indicated in Figure 1, it will be noted that the outer surfaces 13 of the side walls 12 are in contiguous or contacting relation so that the recesses 18 complement each other to provide a plurality of mold cavities 32, best shown in Figure 3. The grooves 19 and 20 on each surface 13 are also effective to complement the grooves 19 and 20 on an adjacent surface so that runner passages 34 are provided.

It can be seen that the segments when positioned in the manner indicated in Figure 1 are securely held in assembly and that the buttons 30 and their engagement with bores 31 formed in adjacent surfaces of the segments are effective to prevent any radial displacement of individual segments during the pouring operation. As indicated a central pouring base 27 will receive the cast metal and a constant pressure will be applied to all of the units of the mold simultaneously from this central pouring basin. The metal will be delivered down the sprue 28 and into the plurality of runner passages 34 which in turn will deliver the material to the mold cavities 32. The mold segments or units cannot separate because each is effective to brace the other sideways while individual radial movement is prevented by the interlocking buttons which are in registry or telescoping position with complementary bores.

By making the wedge-shaped or triangular shaped segments hollow it is possible to suitably brace them by means of the braces or supports 23 which reinforce the relatively thin frangible walls and effectively support them during the pouring operation. Thus it is obvious that additional support for the shell type segments is not necessary and that a somewhat rigid box structure is provided which is self-sufficient in support and suitable for the purpose intended.

Thus expensive backing material, heavy flasks and external and independent clamps and braces are completely omitted by this improved shell mold. Better dimensional control is possible in the castings due to the stronger and more rigid shells with a consequent minimum tendency to warp. Also increased yield is effective by virtue of the construction wherein a common pouring basin, sprue and runner system is provided in combination with the plurality of the cavities presented by the multiple mold. In other words, castings can be poured in a much shorter time due to the common sprue and runner system.

Thus it is obvious that increased advantages are readily apparent from the improved type of shell mold that is herein described. The objects of the invention thus have been fully achieved and it must be understood that modifications may be made which do not depart from the spirit of the invention as disclosed nor the scope thereof as defined in the appended claims.

What is claimed is:

1. A shell type mold including a plurality of triangularly shaped frangible segments, each segment including vertical side walls in abutting relation at first ends and extending in relative diverging relation, upper and lower triangularly shaped walls connected to the side walls to provide a hollow chamber open adjacent second ends of said side walls, a plurality of integral supports extending horizontally within said chamber and connected to said side walls in reinforcing relation, said side walls having outer surfaces including a plurality of laterally spaced recesses, said side walls including grooves extending horizontally from the first ends adjacent to said recesses, second grooves connected to said first grooves, said second grooves communicating with said recesses, a cut-out portion in said segment adjacent the first ends of the side walls and the upper wall, said side walls having an indentation disposed below said first groove, said segments being positioned in circumferentially disposed relation wth adjacent side walls in contiguous relation and said recesses positioned in complementary relation to form cast material receiving cavities, said cut-out portions being circumferentially disposed to define a pouring basin, said grooves being in registry to provide a plurality of runner passages communicating with the recesses and said pouring basin, a frangible removable disk supported in the indentations to provide a bottom for said pouring basin, the segments being circumferentially positioned to provide a generally circularly shaped mold assembly, and sole connecting means on said segments, the connecting means of one segment interengaging the connecting means of an adjacent segment whereby said segments are restrained against radial displacement with respect to the pouring basin and said segments are retained in assembly.

2. A shell type mold including a plurality of triangularly shaped frangible segments, each segment including vertical side walls in abutting relation at first ends and extending in diverging relation, upper and lower triangularly shaped walls connected to the side walls to provide a hollow chamber between said walls, said side walls including outer surfaces having recesses disposed therein, said surfaces having grooves extending from said first ends and communicating with said recesses, a cut-out portion in each segment adjacent the first ends and the upper wall, said segments being positioned in circumferentially disposed relation about a vertical axis with adjacent side walls in contiguous relation and said recesses in complementary relation to provide a cast material receiving cavity, the circumferentially positioned segments providing a substantially circular shell mold structure, said cut-out portions being disposed to provide a pouring basin in communication with said groves, and interconnecting means on said segments, said interconnecting means being interengaged during assembly to provide sole means for maintaining said segments relatively in position with respect to the vertical axis during a metal pouring operation.

3. A shell type mold including a plurality of triangularly shaped frangible segments, each segment including vertical side walls in abutting relation at first ends and extending in diverging relation, upper and lower triangularly shaped walls connected to the side walls to provide a hollow chamber between said walls, said side walls including outer surfaces having recesses disposed therein, said surfaces having grooves extending from said first ends and communicating with said recesses, said segments being positioned in circumferentially disposed relation about a vertical axis with adjacent side walls in contiguous relation and said recesses in complementary relation to provide a cast material receiving cavity, the circumferentially positioned segments providing a substantially circular shell mold structure, said first ends being spaced with respect to the vertical axis to provide a pouring basin in communication with said grooves, and interconnecting means on said segments, said interconnecting means being interengaged during assembly to provide sole means for maintaining said segments relatively in position with respect to the vertical axis during a metal pouring operation.

References Cited in the file of this patent

UNITED STATES PATENTS

| | | |
|---|---|---|
| 2,303,608 | Campbell | Dec. 1, 1942 |
| 2,459,025 | Graham | Jan. 11, 1949 |
| 2,691,196 | Banister | Oct. 12, 1954 |

FOREIGN PATENTS

| | | |
|---|---|---|
| 744,846 | Germany | Jan. 27, 1944 |

OTHER REFERENCES

Bakelite Phenolic Resins, 15 pages; copyright, 1950, by Union Carbide and Carbon Corporation. Page 10 relied on.